United States Patent
Bruckmann et al.

(10) Patent No.: US 6,704,182 B2
(45) Date of Patent: Mar. 9, 2004

(54) METHOD FOR PROTECTION OF A MATRIX CONVERTER AGAINST OVERVOLTAGES, AND AN ACTIVE OVERVOLTAGE DEVICE

(75) Inventors: Manfred Bruckmann, Nuernberg (DE); Olaf Simon, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/254,059

(22) Filed: Sep. 24, 2002

(65) Prior Publication Data
US 2003/0081366 A1 May 1, 2003

Related U.S. Application Data

(63) Continuation of application No. PCT/DE01/00928, filed on Mar. 12, 2001.

(30) Foreign Application Priority Data

Mar. 24, 2000 (DE) .......................... 100 14 665

(51) Int. Cl.$^7$ ............................ H02H 3/20; H02H 9/04
(52) U.S. Cl. ........................................ 361/91.1; 361/21
(58) Field of Search ................... 361/91.1, 111, 361/20, 21; 307/113

(56) References Cited

U.S. PATENT DOCUMENTS

| | | | | | |
|---|---|---|---|---|---|
| 4,272,807 A | * | 6/1981 | Gallagher | .................... | 363/126 |
| 4,487,458 A | * | 12/1984 | Janutka | ..................... | 307/577 |
| 4,697,230 A | * | 9/1987 | Neft | ............................ | 363/163 |
| 6,014,323 A | * | 1/2000 | Aiello et al. | .................. | 363/71 |
| 6,268,990 B1 | * | 7/2001 | Ogura et al. | ............... | 361/91.7 |
| 6,496,343 B2 | * | 12/2002 | Mahlein et al. | ............ | 361/91.1 |

FOREIGN PATENT DOCUMENTS

| | | | | | |
|---|---|---|---|---|---|
| DE | 3109650 | * | 3/1981 | ......... | H03K/17/06 |
| JP | 05 122993 A | | 5/1993 | | |
| JP | 11 146649 A | | 5/1999 | | |

* cited by examiner

Primary Examiner—Brian Sircus
Assistant Examiner—Z Kitov
(74) Attorney, Agent, or Firm—Henry M. Feiereisen

(57) ABSTRACT

A method and a device for protecting a matrix converter is disclosed. The matrix converter has nine bi-directional circuit-breakers which are arranged in a 3×3 switch matrix. A highest potential is detected from all input and/or output potentials or from all input potentials and at least one output potential. Bi-directional circuit-breakers of the matrix converter are controlled when a predetermined threshold value is exceeded. This arrangement protects the entire matrix converter from overvoltages. The converter can be produced easily and cost-effectively.

6 Claims, 10 Drawing Sheets

METHOD FOR PROTECTION OF A MATRIX CONVERTER AGAINST OVERVOLTAGES, AND AN ACTIVE OVERVOLTAGE DEVICE

CROSS-REFERENCES TO RELATED APPLICATIONS

This application is a continuation of prior filed copending PCT International application no. PCT/DE01/00928, filed Mar. 12, 2001.

This application claims the priority of German Patent Application Serial No. 100 14 665.1, filed Mar. 24, 2000, pursuant to 35 U.S.C. 119(a)–(d), the subject matter of which is incorporated herein by reference.

BACKGROUND OF THE INVENTION

The present invention relates to a method for protecting a matrix converter having nine bidirectional power switches, which are arranged in a 3×3 switch matrix, against overvoltages, and to an active overvoltage protection device.

A matrix converter is a self-commutating direct converter. This self-commutating direct converter is a converter without an intermediate circuit. The arrangement of the electronic power switches in a 3×3 switch matrix results in the three input phases being connected to the three output phases. This self-commutating direct converter has the advantage that its topology allows a feedback capability, and appropriately applied control results in sinusoidal power supply system currents. A semiconductor switch integrated in a diode bridge, on the one hand, and two back-to-back series-connected semiconductor switches on the other hand may be used as the bidirectional switches in the switch matrix. The two back-to-back series-connected semiconductor switches in a bidirectional power switch in the switch matrix are configured using either the common emitter mode or common collector mode topology. The embodiment of the bidirectional power switch with a semiconductor switch being embedded in a diode bridge is referred to as an embedded switch.

FIG. 1 shows a circuit diagram of a conventional bidirectional switch 2 in the common collector mode topology. For comparison, FIG. 2 shows a conventional bidirectional power switch 2 in the common emitter mode topology. These two bidirectional power switches 2 each have two semiconductor switches 4 and 6, which are connected back to back in series. In FIG. 1, these two semiconductor switches 4 and 6 are connected back-to-back in series such that the two collector terminals are electrically conductively connected to one another. This back-to-back series circuit formed by the two semiconductor switches 4 and 6 is therefore also referred to as the common collector mode. In FIG. 2, the two semiconductor switches 4 and 6 are connected back-to-back in series such that their emitter terminals are electrically conductively connected. Since the emitter terminals are linked, this circuit is referred to as the common emitter mode. Semiconductor switches which can be turned off, in particular Insulated Gate Bipolar Transistors (IGBT), are used as the semiconductor switches 4 and 6, and each have a reverse diode. The internal topology can be seen from the accessible terminals of the bidirectional power switch 2. In the bidirectional power switch 2 in the common collector mode topology as shown in FIG. 1, the terminals E1, E2, G1 and G2 are accessible on the power switch 2. In contrast to this, in the bidirectional power switch 2 in the common emitter mode topology as shown in FIG. 2, the terminals C1, C2, G1 and G2 are accessible. In addition, these bidirectional power switches 2 have auxiliary terminals EH1 and EH2, which each form a control terminal.

FIG. 3 shows in more detail a circuit diagram of a conventional bidirectional power switch 2 in the embedded switch topology. This bidirectional power switch 2 has a semiconductor switch 5 which can be turned off, in particular an Insulated Gate Bipolar Transistor (IGBT), which is arranged in a diode bridge. The collector side of this semiconductor switch 5 is electrically conductively connected to cathode terminals of two diodes, and its emitter side is electrically conductively connected to anode terminals of two further diodes in the diode bridge. The free terminals of these diodes each form an input and output terminal for the bidirectional power switch 2.

Driving of the semiconductor switches 4 and 6 and of the semiconductor switch 5 in the bidirectional power switch 2 in the matrix converter in each case switches on one current path in a specific direction. If both the semiconductor switches 4 and 6 are actuated, then this allows current to flow in both directions, so that a reliable electrical connection is produced between one input phase and one output phase. If only one semiconductor switch 4 or 6 in the bidirectional power switch 2 in the matrix converter is actuated when the bidirectional power switch 2 is in the common collector mode or common emitter mode topology, respectively, then this results in a connection for only one preferred current direction. One phase of the matrix converter is an arrangement of three bidirectional power switches, which produces a connection from the three power supply system phases to in each case one of the output phases.

Since the matrix converter has no passive freewheeling circuits, in the same way as a voltage intermediate circuit converter, then, particularly in the case of a pulse inhibitor generated on the basis of an EMERGENCY OFF (with the actuate pulses to all the semiconductor switches being switched off), a high reverse voltage occurs across the semiconductor switches owing to the inductances in the circuit. These overvoltages can also occur as a result of a failure of the actuate for the bidirectional power switches. The output current is interrupted in each of these situations that have been mentioned. The interruption in the output circuit in conjunction with the inductances in the circuit causes the overvoltages, which can lead to destruction of the semiconductor switches.

A general overvoltage protection device is known from the publication "Novel Solutions for Protection of Matrix Converter to Three Phase Induction Machine", printed in the Proceedings of the "IEEE Industry Applications Society" New Orleans, La., October 5–9, 1997, pages 1447 to 1454. This overvoltage protection device has two 6-pulse diode bridges, which are linked to one another on the DC voltage side by means of a capacitor. On the AC voltage side, one of the 6-pulse diode bridges is connected to the input terminals of the matrix converter. The other diode bridge is connected on the AC voltage side to the output terminals of the matrix converter. A resistor is connected electrically in parallel with the capacitor, and discharges the capacitor. The input terminals of the matrix converter are also connected to an LC filter, whose input side is connected to a three-phase power supply system. This LC filter, which is also referred to as an input filter, keeps pulse-frequency harmonics away from the power supply system. The size of this filter depends on the pulse repetition frequency of the matrix converter.

Any overvoltages are rectified by the diode bridges and passed to the capacitor. A precharging circuit is required for the capacitor for this overvoltage protection device, which is also disclosed in U.S. Pat. No. 4,697,230. This precharging circuit is required in order that no inrush current surges or overvoltages occur at twice the power supply system voltage when the matrix converter is switched on. Overvoltages such as these cause high surge currents, which have to be carried by the diodes in the diode bridge. The resistor is designed such that its resistance ensures that a predetermined amount of energy is discharged from the capacitor.

An overvoltage protection device with two 6-pulse diode bridges is also known from the publication "Performance of a two Steps Commutated Matrix Converter for AC-Variable-Speed Drives" printed in the Proceedings of EPE'99, Lausanne, September 1999, pages 1 to 9. Each of these two diode bridges has a capacitor on the DC voltage side. These two capacitors are electrically connected in parallel. A Zener diode and a pulse resistor are electrically connected in parallel with these two capacitors, thus limiting the voltage on the capacitors to a predetermined value. Furthermore, each bidirectional power switch has a varistor and two back-to-back series-connected Zener diodes, which limit the overvoltages across the bidirectional power switch.

A number of varistors are provided as an overvoltage protection device in the publication "A Matrix Converter without Reactive Clamp Elements for an Induction Motor Drive System", by Axel Schuster, printed in IEEE, 1998, pages 714 to 720. A varistor is electrically connected in parallel with each semiconductor switch in each bidirectional power switch in the 3×3 switch matrix. These varistors protect the 18 semiconductor switches in the nine bidirectional power switches against overvoltages.

When this overvoltage protection device is used, the junction point of the two collector terminals of the two back-to-back series-connected semiconductor switches must be passed to the exterior when the bidirectional power switch is in the common collector mode. It is also possible for the bidirectional power switch to be formed from individual semiconductor components. A varistor can be electrically connected in parallel with each semiconductor switch in a bidirectional power switch only if the collector terminals, or their junction point, are/is accessible.

A voltage clamping circuit is known from the publication "Beschaltung von SIPMOS-Transistoren" [Circuitry for SIPMOS transistors], printed in "Siemens Components", Volume 22, Issue 4, 1984, pages 157 to 159. This voltage clamping circuit 8 is illustrated as semiconductor switch 4 in FIG. 4. This voltage clamping circuit 8 includes a Zener diode 10, in particular a high-voltage Zener diode which is also referred to as a Transil diode, and a decoupling diode 12. This voltage clamping circuit 8 is connected between the collector terminal C and the gate terminal G of the semiconductor switch 4. An Insulated Gate Bipolar Transistor (IGBT) with a reverse diode is provided as the semiconductor switch 4. The decoupling diode 12 isolates the voltage clamping circuit 8 from the gate terminal G of the semiconductor switch 4 when the semiconductor switch 4 is switched on. When the semiconductor switch 4 is switched off, as soon as its collector/emitter voltage exceeds the sum of the Zener voltage of the Transil diode, the threshold voltage of the decoupling diode 12 and the gate/emitter threshold voltage, the semiconductor switch 4 is actuated automatically. Any overvoltage which occurs across the semiconductor switch 4 is thus actively limited by it, although losses occur in the semiconductor switch 4 and in the Transil diode 10.

This active overvoltage protection device may be used directly in a bidirectional power switch in the common emitter mode topology (FIG. 2). This means that each of the two semiconductor switches 4 and 6 in the directional power switch 4 in the common emitter mode has a voltage clamping circuit 8 connected electrically in parallel with its collector/gate junction. This can also be done without any major complexity, since the required terminals—collector terminal C and gate terminal G—are accessible.

This known voltage clamping circuit 8 for a bidirectional power switch in the common collector mode cannot be used without modifications. Hence, the common collector connection must be passed to the exterior from the bidirectional power switch 2.

It would therefore be desirable to obviate prior art shortcomings and to protect a matrix converter against overvoltages cost-effectively and with little complexity.

SUMMARY OF THE INVENTION

According to one aspect of the present invention, a method includes determining the presence of an overvoltage, automatically actuating all bidirectional power switches which are at risk in the matrix converter. This automatic actuation of the bidirectional power switches actively limits the overvoltage to a predetermined value so that the overvoltage cannot destroy any bidirectional power switches in the matrix converter. With this method according to the invention, the connection of the matrix converter on which an overvoltage occurs is irrelevant, with the only factor of interest being that an overvoltage has occurred. As soon as this is detected, all the bidirectional power switches are actuated in such a way that a detected overvoltage is actively limited.

In one advantageous method, the potentials of the control terminals of all the bidirectional power switches in the matrix converter are evaluated rather than the potentials at the input and/or output terminals of the matrix converter. The advantageous method thus differs only by the location at which an overvoltage is detected, but not in the active limiting of an overvoltage which has been determined.

An active overvoltage protection device according to the invention has at least one rectifier circuit, at least one high-voltage Zener diode and at least one diode circuit, which has a number of diodes with a high blocking capability, with the cathode side of each high-voltage Zener diode being connected to a corresponding output of a rectifier circuit and its anode side being connected to a corresponding input of the diode network. The inputs of the rectifier circuits are connected to input and/or output terminals of the matrix converter or to the input terminals and at least one output terminal of the matrix converter. The cathode sides of the diodes with a high blocking capability in the diode circuit are each connected to one control terminal of the bidirectional power switches in the matrix converter.

In one advantageous embodiment of the active overvoltage protection device, this device is converter-oriented. This means that all the input and output terminals of the matrix converter are connected to the inputs of a rectifier circuit. Furthermore, only one high-voltage Zener diode is used, to whose anode the input of the diode circuit is connected. This converter-oriented refinement of the active overvoltage protection device means that only one high-voltage Zener diode is required.

In a further advantageous embodiment of this advantageous embodiment of the active overvoltage protection device, three diodes with a high blocking capability in the diode circuit are replaced by a diode network comprising three Zener diodes with a low blocking capability and one diode with a high blocking capability. The anode sides of the three low blocking capability Zener diodes are connected to the cathode of the high blocking capability diode, whose anode side is connected to the high-voltage Zener diode. This refinement further reduces the required number of high blocking capability diodes.

The embodiment of the active overvoltage protection device may also be designed on a phase-oriented basis, which then means that three high-voltage Zener diodes and three rectifier circuits are required. In this phase-oriented embodiment of the active overvoltage protection device, three high blocking capability diodes in the diode circuit can each once again be replaced by a diode network comprising three low blocking capability Zener diodes and one high blocking capability diode.

Furthermore, the converter-oriented or phase-oriented embodiment of the active overvoltage protection device may be subdivided depending on the direction of the current flow in the matrix converter. This means that the active overvoltage protection device may be designed jointly or separately on a phase-oriented or converter-oriented basis, and for the forward and return directions. Most of the high-voltage Zener diodes, namely six of them, are used for a phase-oriented embodiment with the forward and return directions separated.

The choice of the embodiment of the active overvoltage protection devices depends on the design of the matrix converter. The bidirectional power switches may all be accommodated in one module. These may also be integrated phase-by-phase in a respective module, or may also be integrated in one module in each case on the power supply system side and load side. Since the design of the active overvoltage protection device is dependent on the design of the matrix converter, parts of the overvoltage protection device may be located in the immediate vicinity of the modules of the converter. This results in a low-inductance link between the active overvoltage protection device and the matrix converter.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 5:
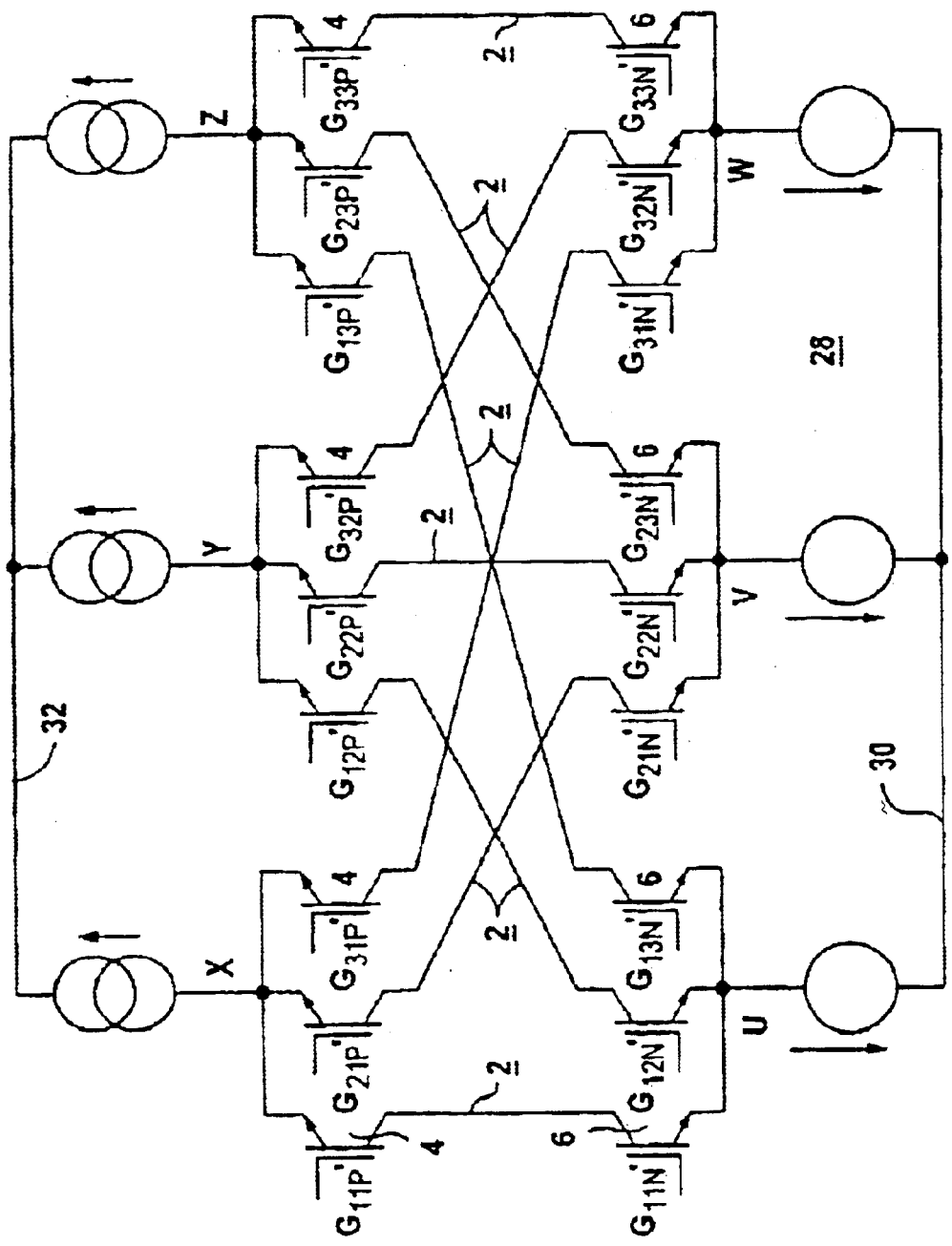
FIG. 5 shows a circuit diagram of a matrix converter with conventional bidirectional power switches as shown in FIG. 1.

Turning now to FIG. 5, there is shown a circuit of a conventional matrix converter 28 which has nine bidirectional power switches 2 in the common collector mode. These bidirectional power switches 2 are arranged in a 3×3 switch matrix. The emitter terminals of these bidirectional power switches 2 form either a respective input terminal U, V or W, or a respective output terminal X, Y or Z, of the matrix converter 28. A three-phase power supply system 30 is connected to the input terminals U, V and W, and a three-phase load 32, in particular a three-phase machine, is connected to the output terminals X, Y and Z. The gate terminals G of the semiconductor switches 6 on the power supply system side of the bidirectional power switches 2 are provided with an index N', with the gate terminals G of the semiconductors 4 on the load side of these bidirectional power switches 2 being provided with an index P'. One phase of the matrix converter 28 is an arrangement of three bidirectional power switches 2, which connects of the three terminals U, V and W on the power supply system side to form in each case one respective load-side terminal X, Y or Z. For this reason, these gate terminals G of the bidirectional power switches 2 are provided with two index numbers. In this equivalent circuit of the matrix converter 28 with bidirectional power switches 2 in the common collector mode, the back-to-back parallel-connected diodes in the back-to-back series-connected semiconductor switches 4 and 6 in the bidirectional power switches 2 have been omitted for reasons of clarity.

Figure 1:
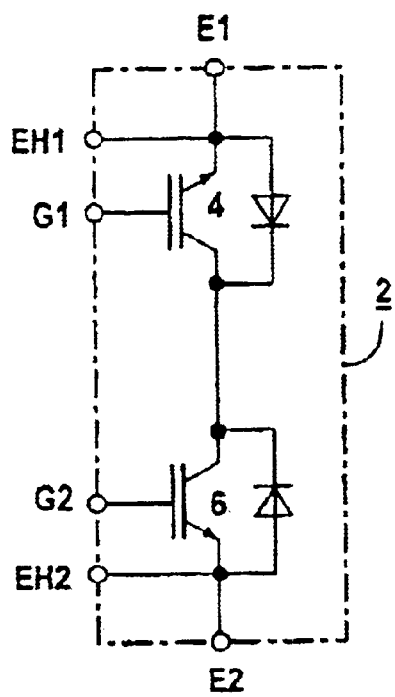
FIG. 1 shows a circuit diagram of a conventional bidirectional power switch in the common collector mode.
Figure 2:
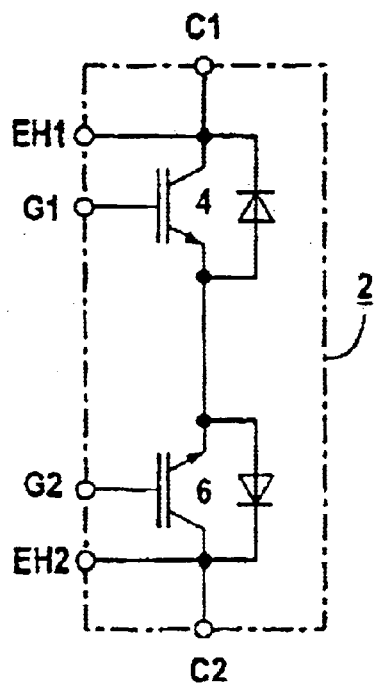
FIG. 2 shows a circuit diagram of a conventional bidirectional power switch in the common emitter mode.
Figure 4:
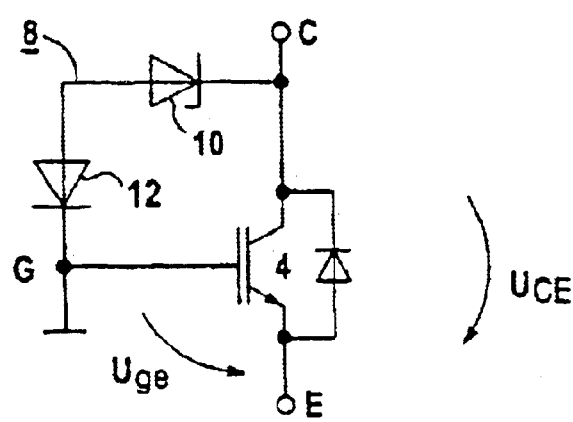
FIG. 4 shows a conventional voltage clamping circuit for a semiconductor switch.
Figure 3:
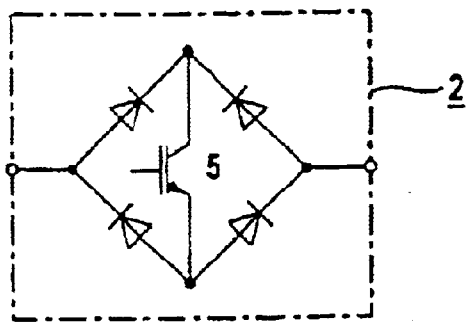
FIG. 3 shows a circuit diagram of a conventional bidirectional power switch as an embedded switch.
Figure 6:
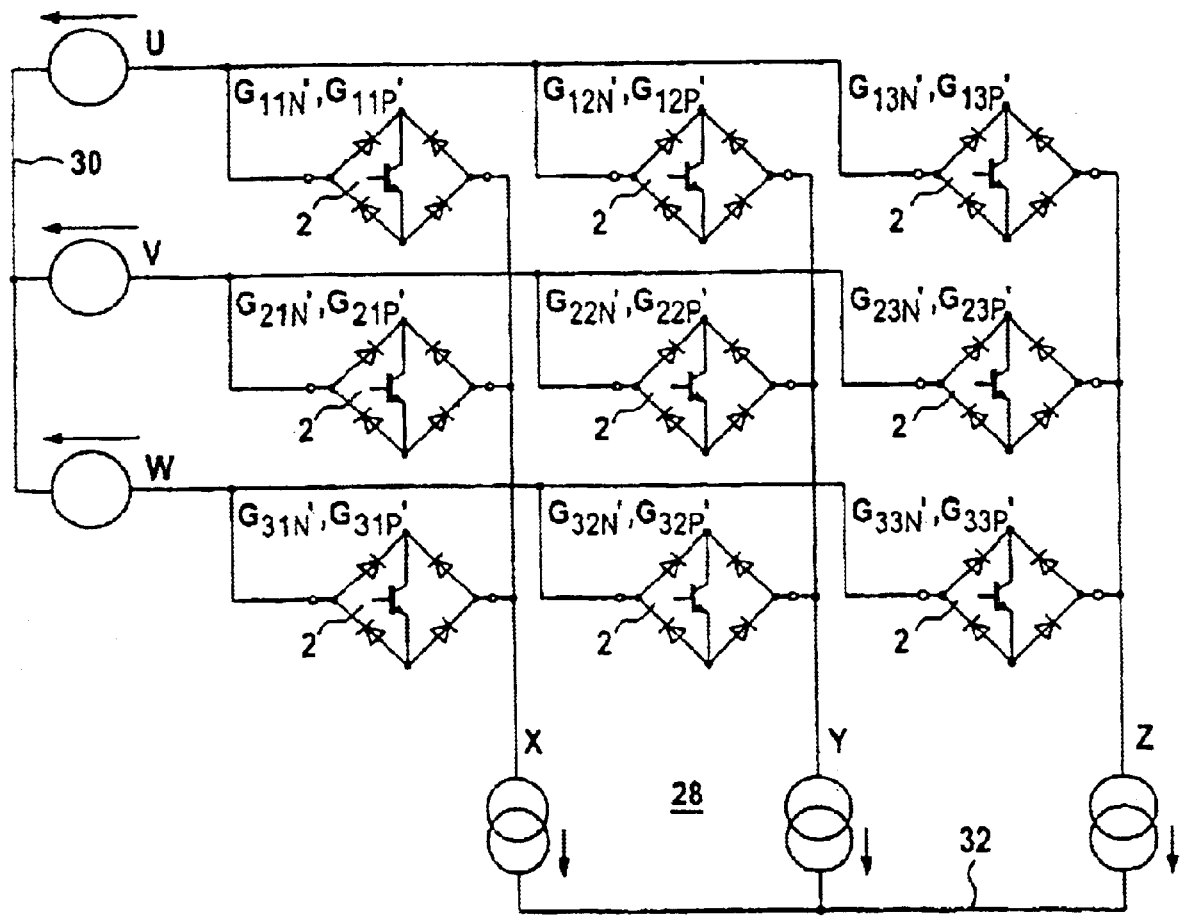
FIG. 6 shows a circuit diagram of a matrix converter with conventional bidirectional power switches as shown in FIG. 3.

FIG. 6 shows this matrix converter 28 with bidirectional power switches 2 in the embedded mode. This matrix converter 28 differs from the matrix converter 28 shown in FIG. 5 only in the topology of the bidirectional power switches 2.

To protect the matrix converter 28 against any overvoltages, an active overvoltage protection device is provided which has at least one rectifier circuit, at least one high-voltage Zener diode and at least one diode circuit.

Figure 7:
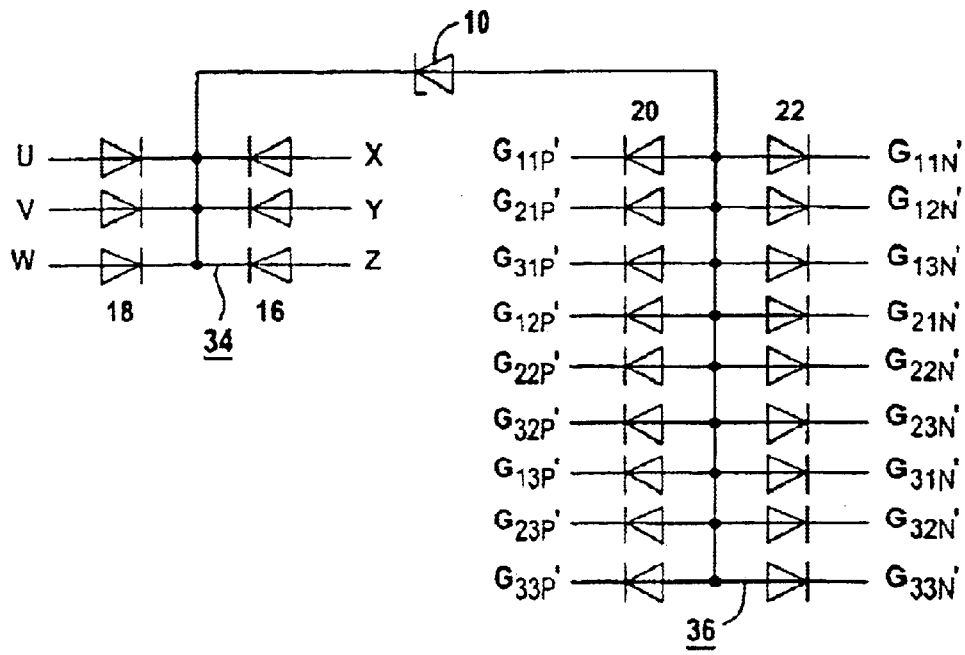
FIG. 7 shows a first variant of an active overvoltage protection device for a converter-based application according to the invention.

Referring now to FIG. 7, a first converter-oriented embodiment of a first variant of the active overvoltage device includes a rectifier circuit 34, a high-voltage Zener diode 10, also referred to as a Transil diode, and a diode circuit 36. The rectifier circuit 34 has three diodes 18 facing the power supply system side, and three diodes 16 facing the load side. The anode sides of the diodes 18 are connected to a respective input terminal U, V or W, and the diodes 16 are linked to a respective output terminal X, Y or Z of the matrix converter 28. The diode circuit 36 has nine diodes 20 and nine diodes 22. The cathode sides of the respective diodes 20 and 22 are connected to gate terminals G of the bidirectional power switches 2 in the matrix converter 28. The anode sides of the diodes 20 and 22 are linked to the anode terminal of the Transil diode 10, whose cathode side is itself electrically conductively connected to the cathode terminals of the diodes 16 and 18 in the rectifier circuit 34. Since the active overvoltage protection device has only one rectifier circuit 34 and only one high-voltage Zener diode 107 this is a converter-oriented design. This converter-oriented active overvoltage protection device is used in an advantageous manner when the matrix converter 28 consists of one module.

Figure 8:
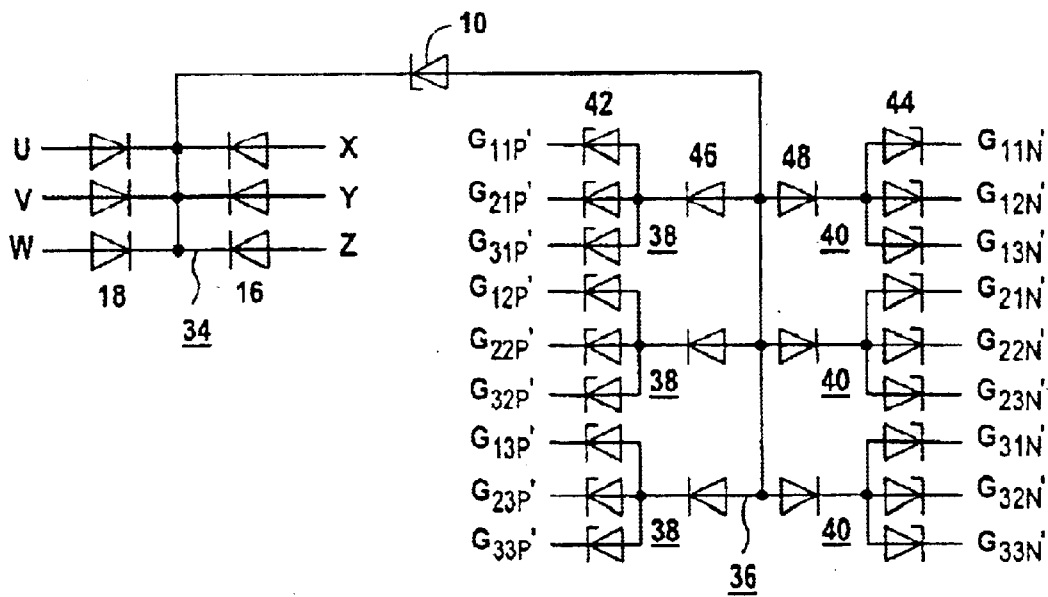
FIG. 8 shows an advantageous embodiment of the first variant of FIG. 7.

FIG. 8 shows one advantageous embodiment of the first variant of the active overvoltage protection device. This advantageous embodiment differs from the embodiment shown in FIG. 7 in that respective diode networks 38 and 40 are provided instead of the respective three high blocking capability diodes 20 and 22 in the diode circuit 36. Each diode network 38, 40 has three low blocking capability Zener diodes 42, 44 and a high blocking capability diode 46, 48. The three low blocking capability Zener diodes 42 and 44 are respectively connected on the anode side to the cathode of the respective high blocking capability diodes 46 and 48, whose anode sides are linked to the anode of the high-voltage Zener diode 10. This refinement reduces the number of high blocking capability diodes 20 and 22 from nine to three, hence reducing the cost of the active overvoltage protection device.

Figure 9:
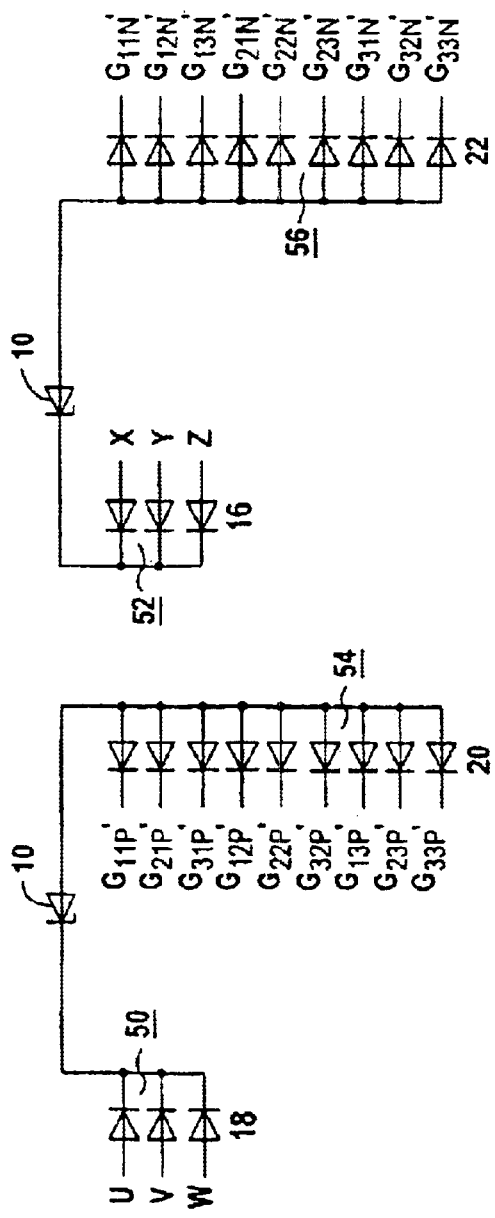
FIG. 9 shows another embodiment of the first variant of an active overvoltage protection device for a converter-based application with separated forward and return directions.

FIG. 9 shows a converter-oriented embodiment of the first variant of the active overvoltage protection device, with the forward and return directions being separated. In comparison to the embodiment shown in FIG. 7, the rectifier circuit 34 and the diode circuit 36 are each halved. This means that the diodes 18 and 16 in the rectifier circuit 34 each form a partial rectifier circuit 50 and 52 while, in contrast, the diodes 20 and 22 in the diode circuit 36 each form a partial diode circuit 54 and 56. On the cathode side, the diodes 18 and 16 are each connected to a cathode terminal of a Transil diode 10. On the anode sides, each of these Transil diodes 10 is connected to the anodes of the respective diodes 20 and 22 in the partial diode circuit 54 and 56. This embodiment of the active overvoltage protection device is preferably used when the matrix converter 28 is in the form of two modules, with all the semiconductor switches 6 on the power supply system side being integrated in one module, and all the semiconductor switches 4 on the load side being integrated in the other module.

Figure 10:
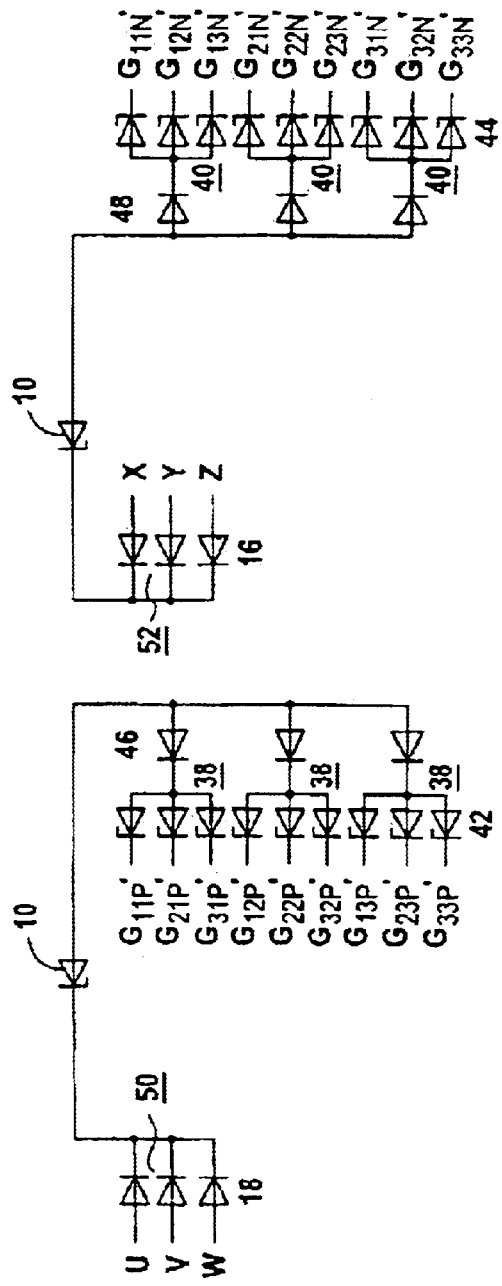
FIG. 10 shows an advantageous embodiment of the active overvoltage protection device of FIG. 9.

FIG. 10 shows one advantageous embodiment of the embodiment shown in FIG. 9 in more detail. In this variant, the number of high blocking capability diodes 20 and 22 has been reduced considerably. Instead of nine high blocking capability diodes 20 and 22 in each of the partial diode circuits 54 and 56, only three high blocking capability diodes 46 and 48 are now required in each case, and are each provided with three low blocking capability Zener diodes 42 and 44. The cathode side of each high blocking capability diode 46 or 48 is in each case electrically conductively connected to an anode terminal of three Zener diodes 42 and 44, whose cathode sides are themselves linked to control terminals of the bidirectional power switches 2 in the matrix converter 28. A reduction in the high blocking capability diodes 46 and 48 means that the diode circuit 36 can be designed in an even more space-saving manner.

Furthermore, this reduces the cost for the active overvoltage protection device for the matrix converter 28.

Figure 11:
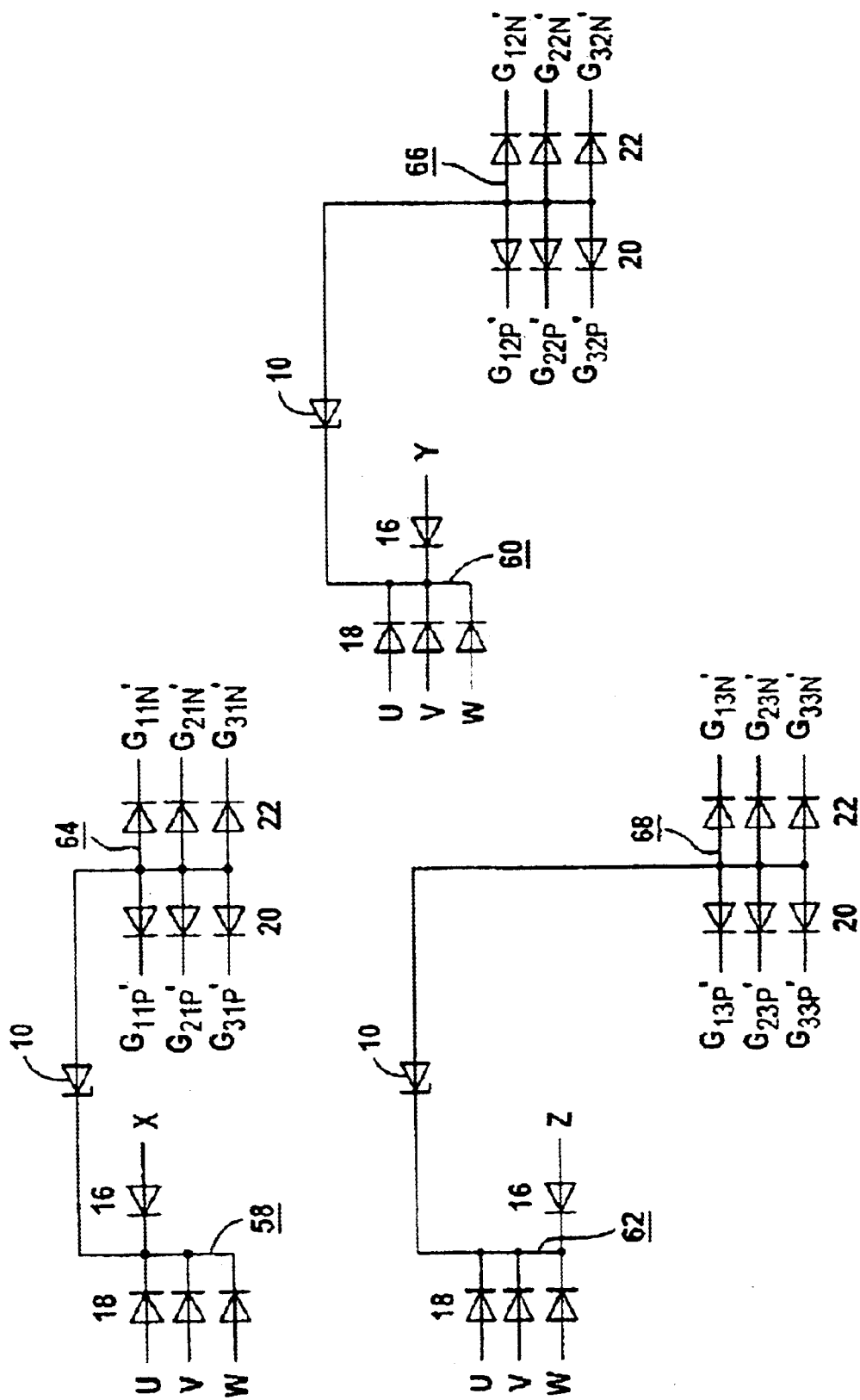
FIG. 11 shows another embodiment of an active overvoltage protection device for a phase-based application.

FIG. 11 shows a phase-oriented embodiment of an active overvoltage protection device according to the invention for a matrix converter 28. This embodiment differs from the embodiment shown in FIG. 7 in that the rectifier circuit 34 and the diode circuit 36 are each subdivided into three partial rectifier circuits 58, 60 and 62, and three partial diode circuits 64, 66 and 68. Each partial rectifier circuit 58, 60 and 62 is connected on one side to the input terminals U, V and W and to one output terminal X or Y or Z, respectively, of the matrix converter 28. The partial diode circuits 64, 66 and 68 are each linked to the control terminals of the bidirectional power switches 2 in one matrix converter phase. In this embodiment, the forward and return directions, as in the case of the embodiment shown in FIG. 7, are not separated. The overvoltage protection device as shown in FIG. 11 can be recommended in particular when the matrix converter 28 has one module for each phase.

Figure 12:
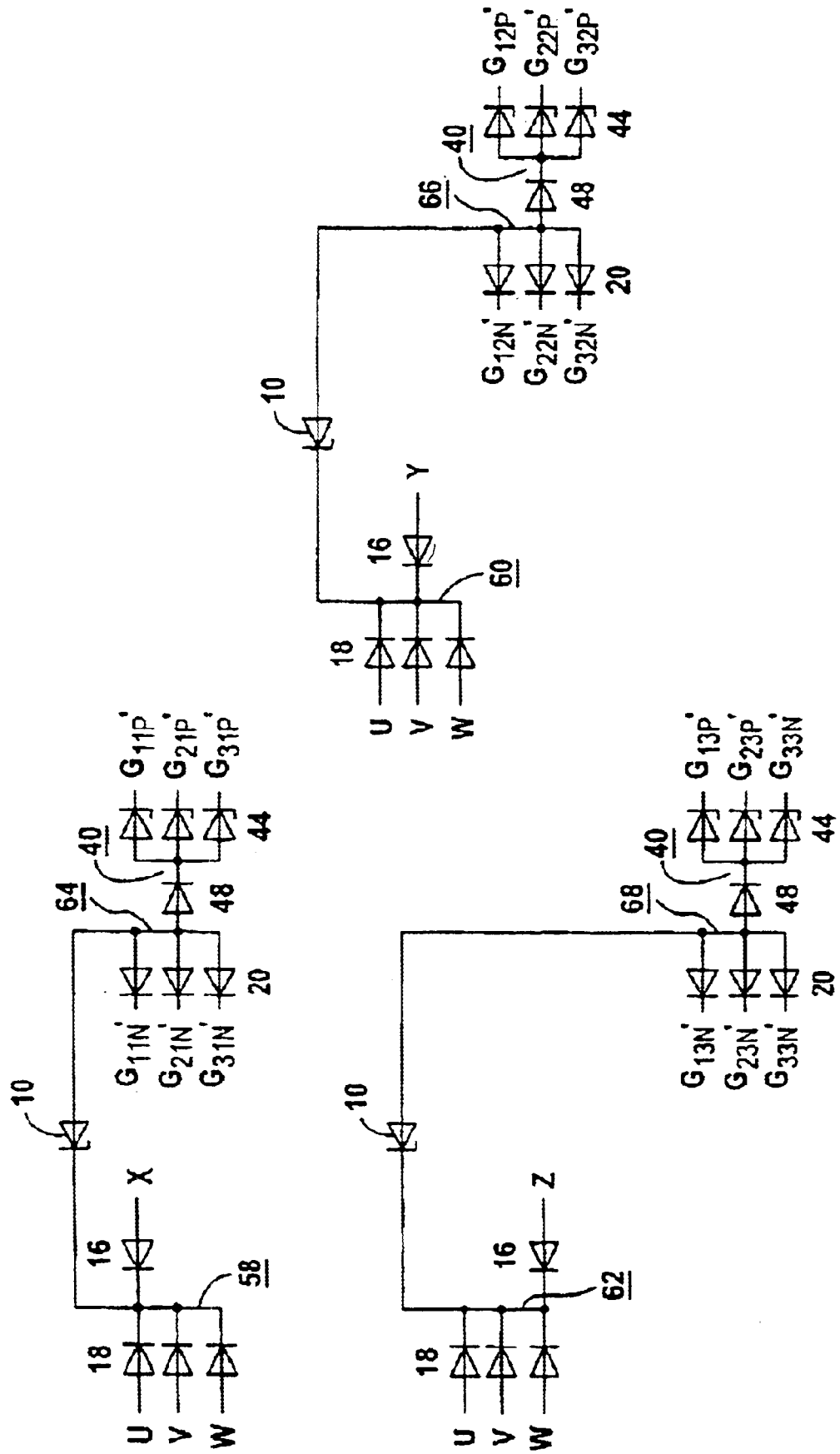
FIG. 12 shows another advantageous embodiment of the active overvoltage protection device of FIG. 11.

FIG. 12 shows one advantageous embodiment of the embodiment shown in FIG. 11, in more detail. In this advantageous embodiment as well, three high blocking capability diodes 20 and 22 in the partial diode circuits 64, 66 and 68 are in each case replaced by a diode network 38 or 40, with only the diode network 40 in each case being shown in more detail here.

Figure 13:
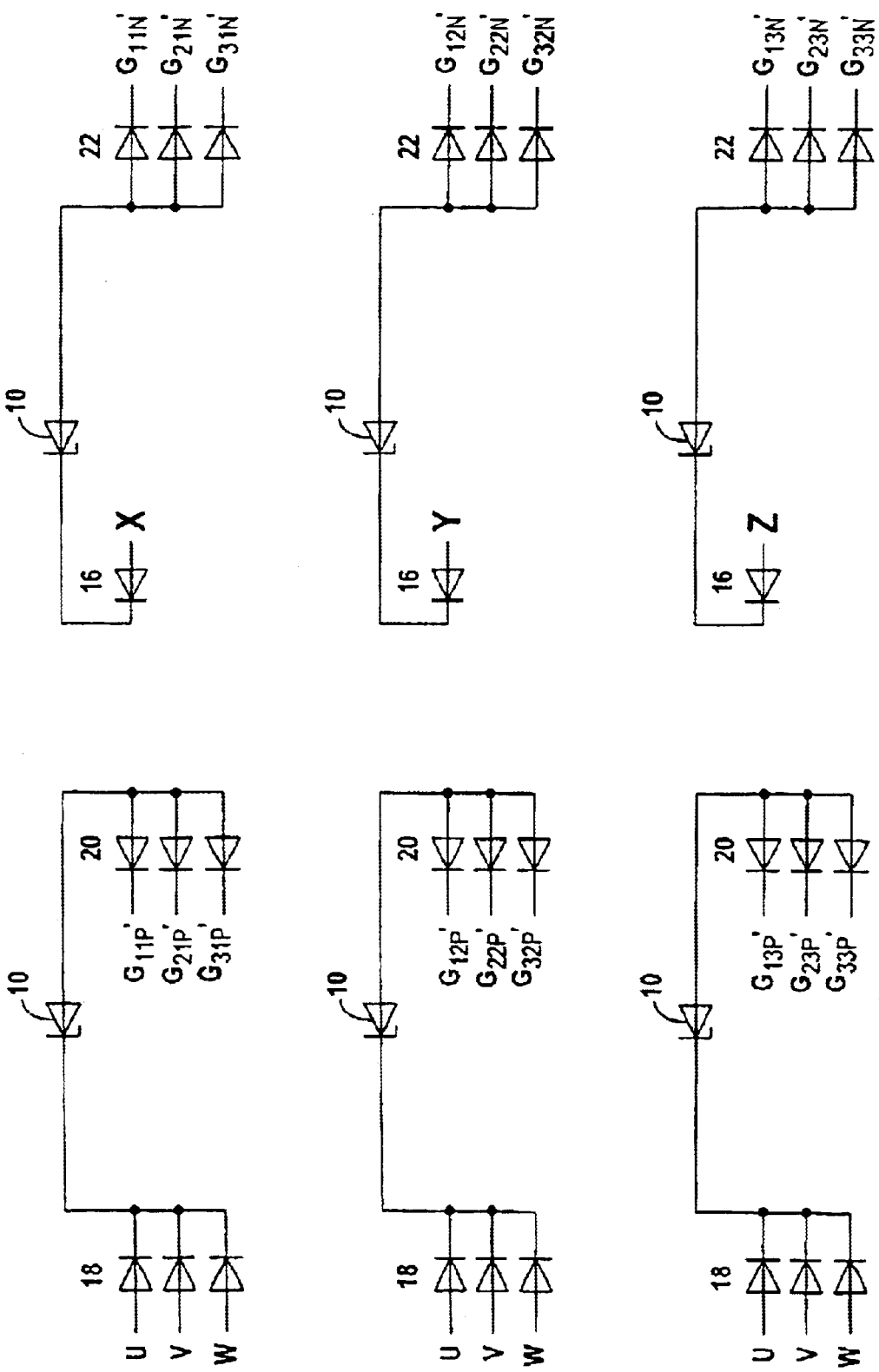
FIG. 13 shows another embodiment of an active overvoltage protection device for a phase-based application with separated forward and return directions.

FIG. 13 shows a phase-oriented embodiment of the active overvoltage protection device according to the invention, with the forward and return directions in the matrix converter 28 being separated. This embodiment differs from the embodiment shown in FIG. 11 in that each partial rectifier circuit 58, 60 and 62 and each partial diode circuit 64, 66 and 68 are halved. This results in only the number of high-voltage Zener diodes 10 being doubled.

Figure 14:
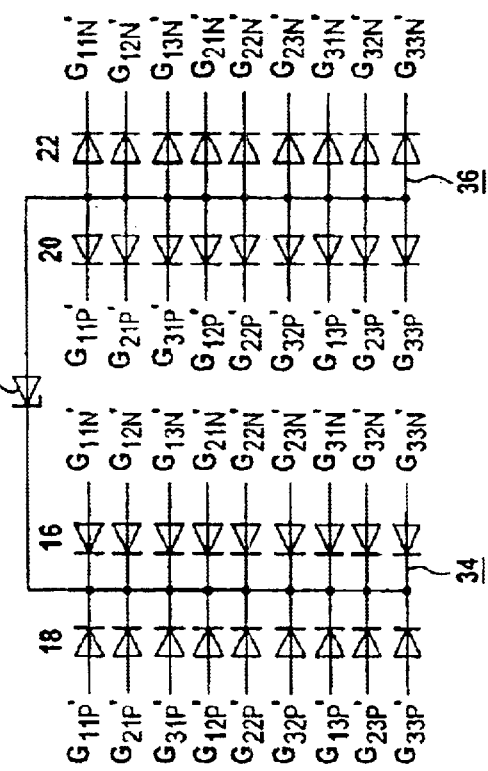
FIG. 14 shows in more detail an embodiment of a second variant of an active overvoltage protection device for a converter-based application with separated forward and return directions.
Figure 15:
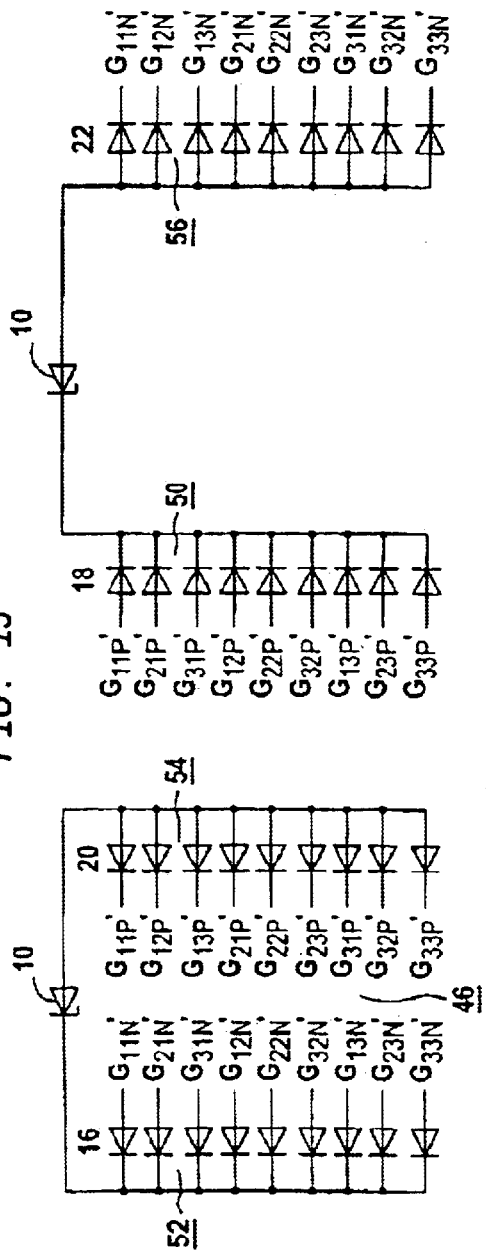
FIG. 15 shows an advantageous embodiment of the active overvoltage protection device of FIG. 14.
Figure 16:
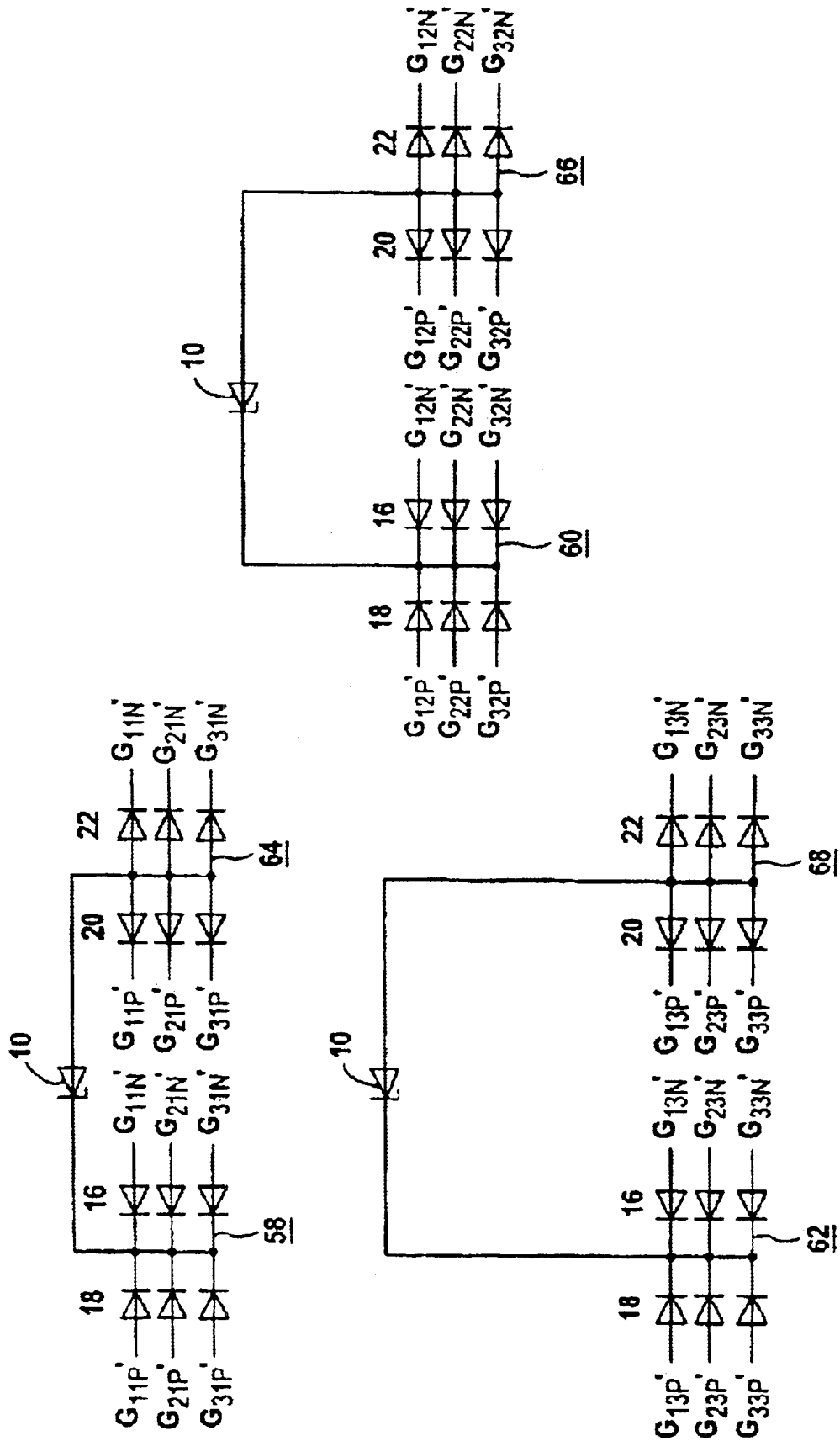
FIG. 16 shows in more detail an embodiment of a second variant of an active overvoltage protection device of FIG. 14 for a phase-based application.

FIG. 14 shows a converter-oriented embodiment of a second variant of the active overvoltage protection device according to the invention in more detail. The major difference from the first variant is that the rectifier circuit 34 is now no longer linked on the input side to the input and output terminals U, V, W and X, Y, Z of the matrix converter 28, but to the control terminals G of the bidirectional power switches 2 in the matrix converter 28. For this reason, the rectifier circuit 34 now has eighteen high blocking capability diodes 16 and 18, whose cathode sides are all connected to one another. This junction point forms the output of the rectifier circuit 34. The design of the diode circuit 36 corresponds to the embodiment of the active overvoltage protection device as shown in FIG. 7. This first embodiment of the second variant of the active overvoltage protection device is thus likewise based on a converter-oriented design. A corresponding phase-oriented embodiment of the second variant is shown in FIG. 16, with a converter-oriented embodiment with the forward and return directions separated being shown in more detail in FIG. 15. These embodiments of the second variant of the active overvoltage protection device as illustrated in FIGS. 14 to 16 can be used only in a matrix converter 28 whose nine bidirectional power switches 2 are configured in the common collector mode or common emitter mode topology. It is impossible to use this second variant of the active overvoltage protection device in a matrix converter with bidirectional power switches 2 using the embedded mode topology.

Since at least one high-voltage Zener diode is used jointly for all the semiconductor switches, 4, 6 and 5 in the bidirectional power switches 2 in the matrix converter 28, the complexity of overvoltage protection of a matrix converter 28 is minimal. The voltage limits for all the semiconductor switches 4, 6 and 5 in the bidirectional power switches 2 are provided by a single high-voltage Zener diode 10 in a converter-oriented embodiment of the active overvoltage protection device. Any voltage which occurs in the matrix converter 28 is determined by this active overvoltage protection device according to the invention, with only the presence of an overvoltage being of interest, and not the location of the overvoltage in the matrix converter 28. Any overvoltage which is found leads, with a converter-oriented embodiment of the active overvoltage protection device, to all the semiconductor switches 4, 6 or 5 in the bidirectional power switches 2 in the matrix converter 28 being actuated such that they actively limit this overvoltage. The overvoltage protection is thus no longer initiated separately for each individual semiconductor switch 4, 6 or 5 in the bidirectional power switches 2 or each individual bidirectional power switch 2, but for the entire matrix converter 28, jointly.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A method for protecting a matrix converter against overvoltages, comprising the steps of:

arranging nine bidirectional power switches in a 3×3 switch matrix, each power switch having a potential value;

determining a highest potential value of at least one subset of electrical potentials, with a first subset consisting of all input potentials, a second subset consisting of all output potentials, and a third subset consisting of all input potentials and at least one output potential, and actuating the bidirectional power switches of the matrix converter if the determined highest potential value exceeds a predetermined potential limit value.

2. A method for protecting a matrix converter against overvoltages, comprising the steps of:

arranging nine bidirectional power switches in a 3×3 switch matrix, each power switch having a potential value;

determining a highest potential value of control potentials of the bidirectional power switches; and actuating the bidirectional power switches of the matrix converter if the determined highest potential value exceeds a predetermined potential limit value.

3. An active overvoltage protection device for a matrix converter with nine bidirectional power switches arranged in a 3×3 switch matrix and connected to input terminals, output terminals and control terminals, the overvoltage protection device comprising:

at least one rectifier circuit having an input side and an output side, at least one high-voltage Zener diode having a cathode side and an anode side, and at least one diode circuit having an input side and an output side, wherein the cathode side of each high-voltage Zener diode is connected to the output side of one of the at least one rectifier circuits, and the anode side is connected to the input of one of the at least one diode circuits, wherein the input sides of the rectifier circuits are connected to the input terminals, or to the output terminals, or to both the input terminals and the output terminals, or to the input terminals and at least one output terminal, and wherein the output side of the at least one diode circuit is connected to a corresponding one of the control terminals of the bidirectional power switches.

4. The device of claim 3, wherein the at least one diode circuit includes a plurality of diodes with a high blocking capability.

5. The device of claim 4, and further including at least one group of three additional Zener diodes with a low blocking capability, wherein the anode sides of the three additional Zener diodes are connected to each other and to a cathode terminal of one of the plurality of diodes.

6. The device of claim 3, wherein a rectifier circuit includes a plurality of diodes having cathode terminals and a high blocking capability, with said cathode terminals being connected to one another to form the output of the rectifier circuit.

* * * * *